March 10, 1970     G. R. MOUNTAIN     3,499,956

PROCESS FOR MAKING THERMOPLASTIC DECORATIVE COVERING MATERIAL

Filed March 22, 1965

INVENTOR.
GEORGE R. MOUNTAIN
BY
*John A. McKinney*
ATTORNEY

United States Patent Office 3,499,956
Patented Mar. 10, 1970

3,499,956
PROCESS FOR MAKING THERMOPLASTIC DECORATIVE COVERING MATERIAL
George Robert Mountain, Somerset, N.J., assignor to Johns-Manville Corporation, New York, N.Y., a corporation of New York
Filed Mar. 22, 1965, Ser. No. 441,659
Int. Cl. B44f 1/06; B29c 9/00, 3/00
U.S. Cl. 264—112          7 Claims

ABSTRACT OF THE DISCLOSURE

Small hard particles are encased in chips of thermoplastic material having a degree of transparency such that the particles are readily discernible through the chips as discrete particles. The chips are fused to the surface of a thermoplastic base to form a thermoplastic tile resembling ceramic tile.

---

This invention relates to thermoplastic decorative covering material and, more particularly, to such material which simulates ceramic tile.

Thermoplastic covering material is widely used on floor and wall surfaces and is available in a variety of designs and appearance. Since the wearability of thermoplastic floor tile has long been acknowledged, the consumer market has become concerned more with the appearance of the tile. For this reason the present trend of the thermoplastic flooring industry is toward creating novel and unusual surface effects and simulating products of nature.

A highly pleasing tile surface is one which suggests the appearance of stone or ceramic. While known embossing techniques can produce a stone-like pattern or configuration on the tile surface, the color or apparent texture of the material does not satisfactorily suggest the appearance of ceramic material. A major deficiency of the thermoplastic tile in this respect is the absence of the small dark specks which ordinarily appear throughout ceramic tile. But if it is attempted to add darker colored thermoplastic particles to the thermoplastic mix in order to simulate such specks, the particles become fused with the thermoplastic material of the base sheet and, in addition, are stretched and extended as the material goes through the calendering rolls, thus losing their identity as small integral pieces of material. When it is attempted to add small, relatively hard particles to the thermoplastic mix to incorporate them within the floor tile product, the problem of proper adhesion of the particles to the mix is encountered. Such particles tend to move to the surface and to extend partially above the surface of the thermoplastic sheet. This, of course, results in a poor tile surface and, in addition, if the floor tile is intended to be opaque even if such particles are properly embedded in the thermoplastic sheet they would not be visible and thus could not properly create the effect of ceramic tile.

It is an object of the present invention to provide a thermoplastic floor tile which simulates ceramic tile.

Another object of the invention is to provide a simple method for incorporating relatively small particles capable of maintaining their identity in thermoplastic floor tile in order to simulate the appearance of ceramic tile.

A further object is to provide a simple method and apparatus for incorporating relatively small particles capable of maintaining their identity in thermoplastic floor tile, which method and apparatus can readily be incorporated in existing production lines without requiring them to be extensively modified.

The invention accomplishes the foregoing objects by encasing relatively small particles capable of maintaining their identity within chips of at least partially transparent thermoplastic material, depositing such chips on the surface of a sheet of thermoplastic material, and consolidating the chips with the sheet so that particles are visible in controlled amounts even though the major portion of the floor tile product is comprised of opaque thermoplastic material. In the context of this invention, thermoplastic material which is "at least partially transparent" is translucent or transparent to a degree such that particles encased in a chip of such material are readily discernible as discrete particles.

The nature of the invention will be more fully understood and other objects may become apparent when the following detailed description is considered in connection with the accompanying drawings, wherein.

Figure 1:
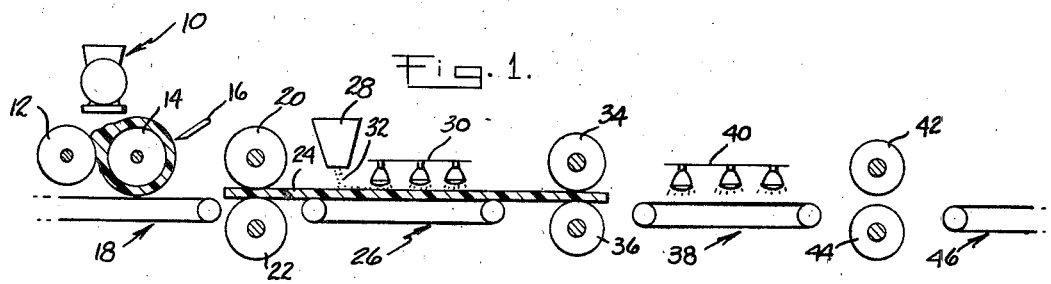
FIG. 1 is a diagrammatic representation of a process for manufacturing thermoplastic floor tile incorporating the present invention.

Referring to FIG. 1 of the drawing, a typical method of manufacturing a thermoplastic floor tile product according to the present invention comprises first introducing into a mixer 10 the ingredients of the base sheet of the thermoplastic floor tile. These ingredients usually comprise a resin, such as vinyl resin, plasticizer, pigment and filler material, such as, for example, asbestos fibers. The mixture of ingredients is deposited from the mixer 10 to the mill rolls 12 and 14 which work the material until it is homogeneous and ready to be sheeted into a thermoplastic sheet. A doctor blade 16 is then actuated and the thermoplastic slab of material on the roll 14 drops to the conveyor 18 beneath the mill rolls. The conveyor 18 transports the slab between the calender rolls 20, 22 which compress the slab into a sheet 24 of predetermined thickness. Upon emerging from the nip of the calender rolls 20, 22 the sheet is supported and transported by the conveyor 26 first beneath a chip depositing device 28 and then beneath a bank of heaters 30 which heat the sheet 24 and the layer of thermoplastic chips 32 supported on the sheet to a temperature at which the chips may be fused. Calender rolls 34 and 36 then press the sheet and the layer of chips at a sufficient pressure to fuse the chips to each other and to the sheet. Thereafter, another conveyor 38 moves the sheet 24 beneath a second bank of heaters 40 which maintain the temperature of the sheet and chips at that required for fusing of the composition. The sheet then passes through a third set of calender rolls 42, 44 which press the sheet to final thickness and provide a smooth surface finish. After the final calendering operation the sheet passes to the conveyor 46 which conveys it to further operating stations for other purposes, such as trimming and packaging. Since these operations have no effect on the invention they have not been shown.

Figure 2:
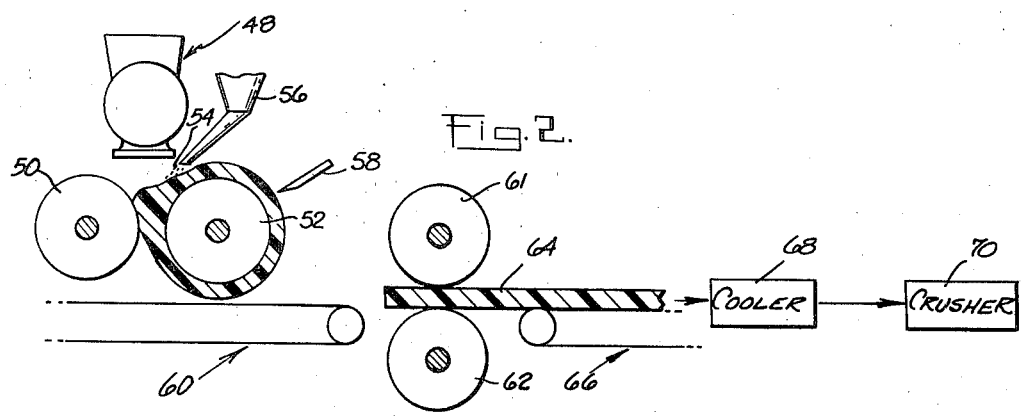
FIG. 2 is a diagrammatic representation of a manufacturing operation for forming the chips which encase the particles.

Referring to FIG. 2, in making the chips which encase the particles, ingredients for making a translucent or transparent sheet of thermoplastic material are added to the mixer 48 which, after satisfactorily mixing the ingredients together, deposits the composition at the nip of the mill rolls 50, 52. Translucency or transparency is achieved by using fillers of a type which do not cause the resulting sheet to become opaque, or by not utilizing a filler at all. Since the usual unfilled resinous material utilized in thermoplastic compositions for making floor tile products has too much elastic memory to be worked adequately on a calender roll apparatus, it is preferred that filler material such as talc, limestone, or various types of silicates be used in the mix. When such a composition is completely mixed on the rotary mill a minor quantity of relatively small, relatively hard particles 54 is added to the mixture from a suitable depositing apparatus 56.

Many different types of materials can be useed to form the particles, but they should not soften or otherwise be affected by the heat and pressure to which the flooring composition is subjected in the manufacturing process in any way which would cause the particles to lose their identity in the final tile product. Nor should they be affected in this manner by any of the other ingredients of the flooring composition. Their identity as small discrete particles in the final product is necessary to produce the appearance of the "specking" which occurs in ceramic tile. Preferred materials are minerals, such as, for example, small particles of marble, colored glass, sand, and the like. Examples of other materials which could be used are metal particles and particles of thermoset resin. It is preferred that the size of the particles be within the range of approximately 14 mesh to 20 mesh U.S. Standard Screen size since this range results in a realistic ceramic tile appearance. The particles may range in size from about ⅛ inch to about 40 mesh. The practical maximum limit on the size of the particles is determined by the thickness of the thermoplastic chip in which the particle is encased, and by the minimum thickness of the tile, which generally is about ⅛ inch. Obviously, the particles should have a lesser diameter or thickness than the thickness of the chips. If the particles are too small, on the other hand, they will not be readily noticeable in the tile and the desired benefit of the particle i.e., creating the effect of stone or ceramic tile, is lost. Also, if too small, the particles act in effect as a pigment, which destroys the desired ceramic effect.

After the particles have been added to the thermoplastic mixture, milling is continued until the particles are dispersed throughout the composition. The thermoplastic composition is then stripped from the mill by means of doctor blade 58, and the resulting slab drops to the conveyor 60 which transports it to the nip of the calender rolls 61, 62 where the slab is pressed into the sheet form of desired thickness. The resulting sheet 64 of translucent or transparent thermoplastic material having the particles therein is then transported by conveyor 66 to a cooling station 68, which may take the form of cooled rolls or watersprays. After the material is cooled it is then introduced to a crushing apparatus 70 which breaks the cooled sheet into small chips, many of which encase a particle.

Figure 3:
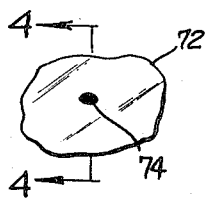
FIG. 3 is an enlarged plan view of a thermoplastic chip having a relatively small particle encased therein.
Figure 4:
FIG. 4 is a transverse sectional view of a thermoplastic chip taken on line 4—4 of FIG. 3.

As shown in FIGS. 3 and 4, a chip 72 of translucent or transparent thermoplastic material may be irregular in shape, generally varying in size between about ⅛ inch and 1½ inches. The thickness of the chips may vary, but should be slightly thicker than the size of the particles encased therein. A typical construction is illustrated in the drawings, wherein a small particle 74 is embedded within the chip and does not extend to the flat surfaces thereof, thus leaving the surfaces of the chip flat and smooth. Subsequently, when such chips are deposited on the upper surface of the thermoplastic sheet 24, illustrated in FIG. 1, and later heated to their fusing temperature and pressed so as to fuse them to each other and to the sheet, the identity of each individual chip is lost and the exposed surface of the floor tile material appears to be composed of the translucent or transparent material of the chips. Of course, if the chips are scattered sparsely over the surface of the thermoplastic sheet, the base sheet material will be exposed between the chips and may in some instances enhance the desired design appearance. The small particles 74 appear through the translucent or transparent material as small specks, similar to the specks visible in ceramic tile. The degree of transparency of the thermoplastic material may vary, but it should be such that the particles are readily discernible through the material of the chips.

Figure 5:
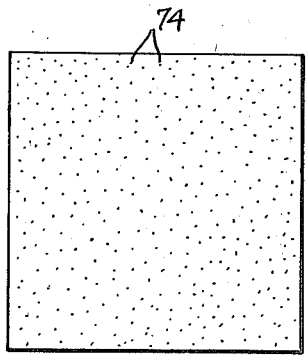
FIG. 5 is a plan view of a floor tile manufactured in accordance with the present invention; and, FIG. 6 is a plan view of a floor tile similar to that of FIG. 5, but showing in addition to the particles which are visible on the surface thereof, an embossed design which further contributes to the realistic appearance of a ceramic tile product.

Referring to FIG. 5, a floor tile 76 manufactured according to the present invention is illustrated. Although the individual chips are not visible as discrete elements, the particles 74 are visible and cause the floor tile to have the appearance of ceramic tile.

Figure 6:
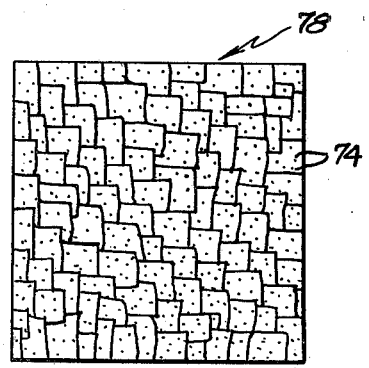

As shown in FIG. 6, the surface of the tile 78 additionally may be embossed or otherwise made to appear as if composed of small pieces of stone or ceramic tile, thus increasing the suggestion of a ceramic tile product. It has been found that when such an embossed pattern is provided the small particles 74 create an extremely pleasing and ceramic-like appearance.

It should be understood that while the invention has been described mainly with respect to flooring, the use of thermoplastic material, constructed according to the present invention, in other environments is also contemplated by the invention.

It is to be understood that variations and modifications of the present invention may be made without departing from the spirit of the invention. It also is to be understood that the scope of the invention is not to be interpreted as limited to the specific embodiment disclosed herein, but only in accordance with the appended claims, when read in the light of the foregoing disclosure.

What I claim is:
1. In a process of manufacturing decorative thermoplastic covering material resembling ceramic tile, the steps of:
   (a) forming a sheet of thermoplastic material,
   (b) depositing on the surface of the sheet relatively small chips of thermoplastic material, some of which chips encase at least one particle of material,
   (c) the thermoplastic material being transparent at least to a degree such that the particles within the chips are readily discernible,
   (d) the particles being comprised of material capable of maintaining its identity throughout the process and being large enough to be visible as discrete particles in the chip, and
   (e) applying sufficient heat and pressure to the layer of chips and the thermoplastic sheet to fuse the chips together and to the sheet to form a covering layer through which the particles encased in the chips are readily discernible, such particles simulating small dark specks found in ceramic tile, thus causing the thermoplastic covering material to resemble ceramic tile.

2. A process of manufacturing decorative thermoplastic covering material as recited in claim 1, wherein the size of the particles is between about 40 mesh U.S. Standard Screen size and about ⅛ inch.

3. In a process of manufacturing decorative thermoplastic covering material resembling ceramic tile, the steps of:
   (a) mixing relatively small, relatively hard particles in a thermoplastic composition which is transparent at least to a degree such that the particles, when disposed within a sheet of the thermoplastic material, are readily discernible,
   (b) forming a sheet of the combined thermoplastic composition and particles;
   (c) cooling the sheet,
   (d) forming small chips from the cooled sheet, some of the chips having at least one particle therein,
   (e) depositing the chips on the surface of a second thermoplastic sheet, and
   (f) applying heat and pressure to consolidate the chips, both with each other and with the second thermoplastic sheet to form a decorative thermoplastic sheet, the surface of which has a substantial amount of thermoplastic composition thereon through which a substantial number of discrete particles encased therein are readily discernible, such particles simulating small dark specks found in ceramic tile, thus causing the thermoplastic covering material to resemble ceramic tile.

4. A process of manufacturing decorative thermoplastic covering material as recited in claim 3, wherein the composition containing the particles comprises filled vinyl resin.

5. A process of manufacturing decorative thermoplastic covering material as recited in claim 3, wherein the size of the particles is in the approximate range of about 40 mesh U.S. Standard Screen size and about 1/8 inch.

6. A process of manufacturing decorative thermoplastic covering material as recited in claim 3, wherein the particles are of mineral composition.

7. In a process of manufacturing decorative thermoplastic covering material resembling ceramic tile, the steps of:
(a) mixing relatively small, relatively hard particles in a thermoplastic composition which is transparent at least to a degree such that the particles, when disposed within a sheet of the thermoplastic material, are readily discernible,
(b) forming a sheet of the combined thermoplastic composition and particles;
(c) forming small chips from the sheet, some of the chips having at least one particle therein,
(d) depositing the chips on the surface of a second thermoplastic sheet, and
(e) applying heat and pressure to consolidate the chips, both with each other and with the second thermoplastic sheet to form a decorative thermoplastic sheet, the surface of which has a substantial amount of thermoplastic composition thereon through which a substantial number of discrete particles encased therein are readily discernible, such particles simulating small dark specks found in ceramic tile, thus causing the thermoplastic covering material to resemble ceramic tile.

References Cited

UNITED STATES PATENTS

| | | |
|---|---|---|
| 2,454,910 | 11/1948 | Carr. |
| 2,761,176 | 9/1956 | Welch et al. _____ 161—162 XR |
| 2,871,152 | 1/1959 | Tobin _____ 161—5 XR |
| 3,328,231 | 6/1967 | Sergovic _____ 161—162 |
| 3,344,011 | 9/1967 | Goozner _____ 161—162 XR |

ROBERT F. BURNETT, Primary Examiner

W. A. POWELL, Assistant Examiner

U.S. Cl. X.R.

117—9, 21; 156—219, 265, 297; 161—5, 6, 116; 264—140, 245